Oct. 9, 1928.
A. S. BOWERSOX
AUTOMOBILE SIGNAL
Filed Oct. 19, 1927
1,687,053
2 Sheets-Sheet 1
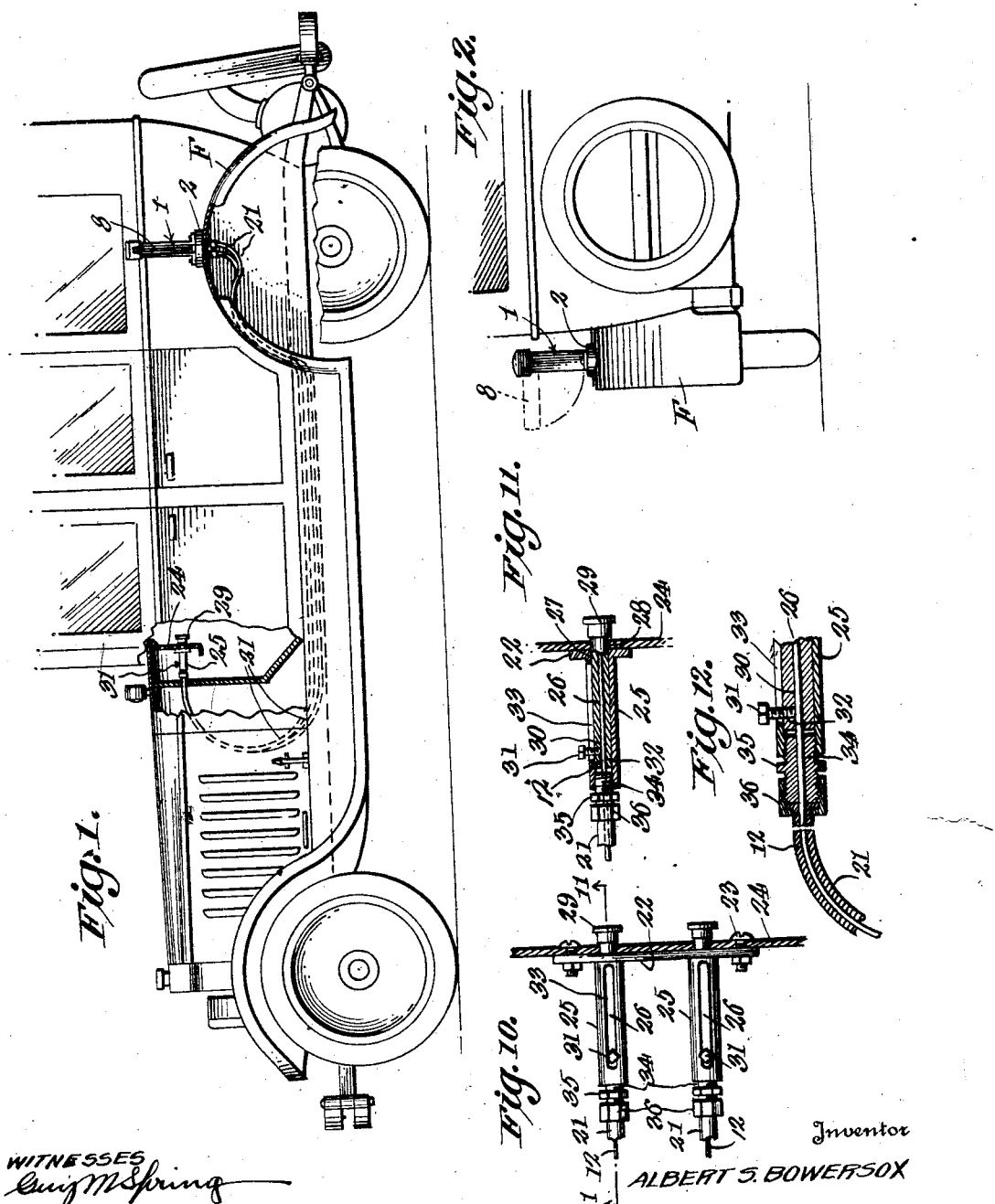
Inventor
ALBERT S. BOWERSOX
By Richard B. Owen, Attorney
WITNESSES Oct. 9, 1928.
A. S. BOWERSOX
1,687,053
AUTOMOBILE SIGNAL
Filed Oct. 19, 1927
2 Sheets-Sheet 2
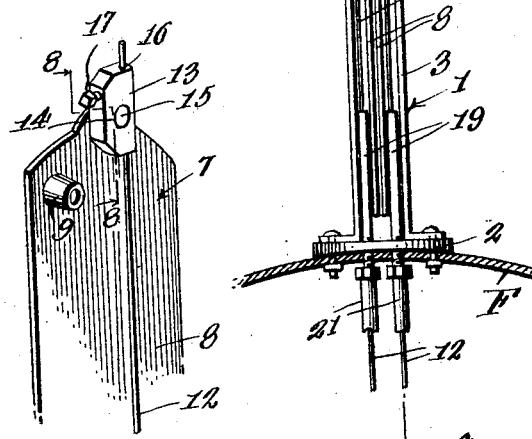
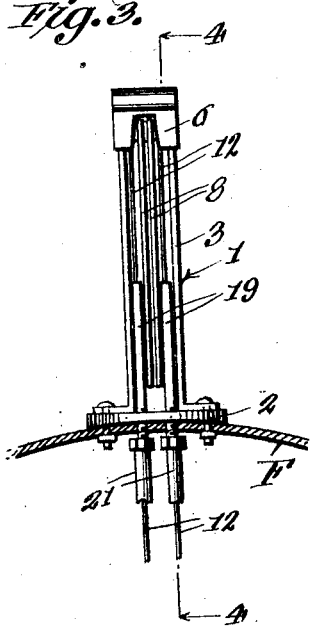
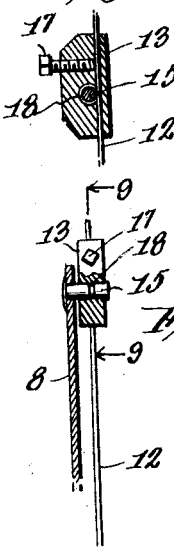
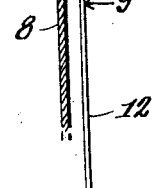
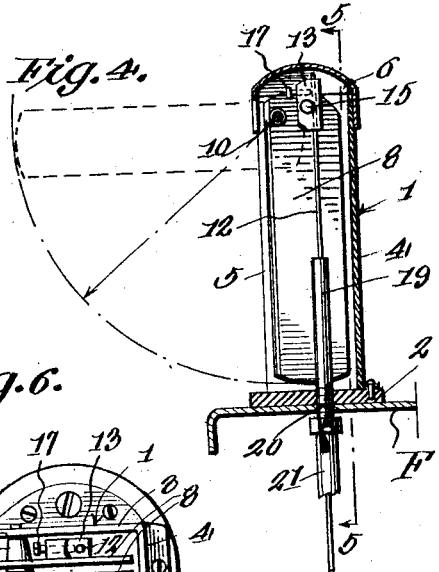
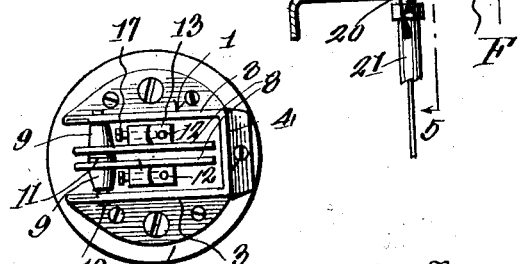
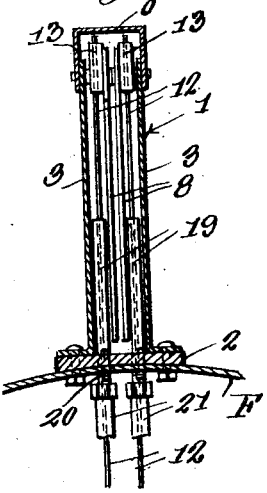
Inventor
ALBERT S. BOWERSOX Patented Oct. 9, 1928.

1,687,053

UNITED STATES PATENT OFFICE.

ALBERT S. BOWERSOX, OF FLETCHER, OHIO.

AUTOMOBILE SIGNAL.

Application filed October 19, 1927. Serial No. 227,300.

This invention relates to improvements in signaling devices for automobiles and has as its general object to provide signaling means adapted to be conveniently operated by the driver of the automobile upon which the means is installed, to display precautionary signals to be observed by the drivers of following automobiles, and which means will possess decided advantages over signaling devices which have heretofore been employed.

Another object of the invention is to provide a signaling device particularly adapted for installation upon automobiles of the closed types and adapted to be controlled by the driver of the automobile in a manner to display precautionary signals with the same degree of certainty as though the signals were made by hand, as is usually done, thus obviating the necessity of keeping the window pane beside the drivers seat, in a lowered or open position in inclement weather.

Another object of the invention is to provide a signaling device of the class described so constructed that when actuated to display one or another of the signal members thereof, the signal member may be adjusted to any desired position and may be maintained in such position without the necessity of the driver of the automobile maintaining his grasp upon the control or adjusting means, so that if the caution signal member is adjusted to display position, the hand of the driver of the automobile may be released from the actuating means for this signal member so long as the signal is required to be displayed.

While the accompanying drawings and the description which is to follow, constitute a disclosure of the preferred embodiment of the invention, it will be understood that various changes may be made within the scope of what is claimed.

In the accompanying drawings:
Figure 1 is a view in side elevation of the signaling device embodying the invention installed upon an automobile of one of the closed types;

Figure 2 is a view in rear elevation illustrating the housing for the signal members and the manner in which the same is mounted upon the left rear fender of the automobile, the view illustrating one of the signal members in display position, in dotted lines;

Figure 3 is a view in side elevation of the signal proper, the signal members being in lowered or inactive position;

Figure 4 is a vertical transverse sectional view taken substantially on the line 4—4 of Figure 3 looking in the direction indicated by the arrows;

Figure 5 is a vertical sectional view taken substantially on the line 5—5 of Figure 4 looking in the direction indicated by the arrows;

Figure 6 is a plan view of the signal proper, the closure for the top of the housing being removed;

Figure 7 is a fragmentary perspective view of the inner portion of one of the signal members and illustrating a part of the means provided for actuating the same;

Figure 8 is a vertical sectional view through one of the signal members taken approximately on the line 8—8 of Figure 7 looking in the direction indicated by the arrows;

Figure 9 is a vertical sectional view taken substantially on the line 9—9 of Figure 8 looking in the direction indicated by the arrows;

Figure 10 is a plan view of the means for controlling the adjustment of the signal members;

Figure 11 is a vertical longitudinal sectional view taken substantially on the line 11—11 of Figure 10 looking in the direction indicated by the arrows;

Figure 12 is a detail vertical sectional view similar to Figure 11.

The device embodying the invention includes, in its construction, signal members which are mounted in a housing supported upon the rear left fender of the automobile upon which the device is installed, and, means, to be presently described, for adjusting the signal members, and in the drawings the housing is indicated by the numeral 1 and preferably comprises a base 2 which is bolted or otherwise secured to the crown of the rear left fender, indicated by the reference letter F, of the automobile as clearly shown in Figures 1 to 5 inclusive of the drawings, the housing proper being preferably of sheet metal and comprising spaced side walls 3, a vertical connecting wall 4, and an open side which is indicated by the numeral 5 and which is presented laterally outwardly and through which the signal members, which are normally housed within the housing, are to be projected to assume the desired display positions. The housing is closed at its top by means of a cap member 6 which may be held in place in any desired manner and which serves, of course, to close the upper end of the housing and prevent the entrance of rain and snow.

The signal members may be of any desired number, and, in the illustrated embodiment of the invention, two such members are provided, and each of these members, which is indicated in general by the numeral 7, comprises a signal blade 8 which is preferably of sheet metal and which has applied thereto a surfacing of paint or enamel of a distinctive color. A bearing sleeve 9 is fixedly mounted upon each signal blade 8 adjacent what constitutes the upper outer corner of the blade when the blade is in inactive or non-display position within the housing 1, and, as illustrated most clearly in Figure 6 of the drawings, the bearing sleeves 9 are formed upon the relatively opposite sides of the two blades 8, the blades having their relatively adjacent sides positioned relatively close to each other and the said bearing sleeves 9 of the blades projecting toward the relatively adjacent side walls 3 of the housing 1. A pivot pin 10 is fitted through the bearing sleeves 9 of the blades and mounted at its ends in openings in the side walls 3 of the housing near the upper end of the open side 5 thereof as illustrated in Figures 4 and 6 of the drawings. As a matter of convenience, in securing the bearing sleeves 9 to the blades 8, and likewise to provide means whereby the blades may be maintained in spaced relation with respect to each other, the said sleeves may be reduced in diameter at their ends which are connected with the said signal blades 8 and fitted through openings in said blades and headed as at 11, the headed ends of the sleeves mutually abutting as clearly shown in Figure 6 of the drawings. At this point it will be evident that the signal blades 8 may be swung outwardly, independently of each other to extend horizontally laterally outwardly beyond the open side of the housing as shown in dotted lines in Figures 2 and 4 of the drawings or to assume any desired intermediate position of angular adjustment, the blades being normally housed within the housing 1 and, in this position, being suspended vertically from the pivot pin 10.

Angular adjustment of the signal blades 8 is effected through the medium of semi-flexible connections which lead from actuating plungers to be presently described, and these connections, which are indicated in the drawings by the numeral 12, are preferably in the form of wires of suitable length each of which is connected at one end to a respective one of the signal blades 8 by a means which will now be described. The means referred to comprises a pivot block 13 which is of metal and is formed with an opening 14 adapting it to be rotatably fitted onto a pivot stud 15 which is fixed upon the inner end of the respective signal blade 8 at that side thereof from which the respective bearing sleeve 9 projects, and the pivot block is formed with a bore 16 of a diameter to snugly receive the said end of the respective wire 12, and in order that the said end of the wire may be secured in the bore and therefore fixed with respect to the block, a set screw 17 is threaded into the block and bears at its inner end against the end portion of the wire 12. In order that the pivot block 13 may be held assembled with the pivot stud 15 and at the same time have free rotary movement about the stud, the said pivot stud is formed with a circumferential groove indicated by the numeral 18, and the bore 16 is so arranged with respect to the opening 14 as to communicate, at one side, therewith, so that when the end of the wire 12 is inserted into the bore 16, the wire will engage also in the groove 18 thus serving, as stated, to connect the block 13 with the pivot stud 15. From the respective pivot blocks 13, the actuating wires 12 are led downwardly and through tubular guides 19 which are preferably threaded at their lower ends as at 20 through openings in the base 2 of the housing 1, the lower ends of these guides extending through openings which will be formed in the fender F, so that the wires 12 may be led downwardly and below the crown of the fender upon which the housing is mounted. By reference to Figures 3, 5 and 6 of the drawings, it will be observed that the tubular guides 19 are located between the respective signal blades and the adjacent side walls 3 of the housing 1 and at this point it will be evident that when a downward pull is exerted upon either wire 12, the respective pivot block 13 to which it is connected will be moved downwardly thus effecting an upward and outward swinging movement of the respective signal blade 8, the degree of such movement depending upon the distance to which the actuating wire 12 is moved. This adjustment of either wire 12 does not impose any bending or twisting strain upon the wire inasmuch as the block 13, to which the wire is connected, is pivotally mounted upon the respective pivot stud 15, the block therefore maintaining its perpendicular position shown in Figures 4 and 7 of the drawings. From the tubular guides 19, the actuating wires 12 are led through tubular guide sheaths 21, to the actuating devices which are mounted upon the instrument board of the automobile and which will now be described, the said tubular guide sheaths 21 being preferably of copper, brass, or other metallic tubing of internal diameter to slidably accommodate the respective actuating wires 12 and at the same time, through the presence of certain bends in the said sheaths, which are rendered necessary by reason of deviations in the direction of extent of the sheaths between their ends which are connected to the tubular guides 19 and their ends which are connected to the actuating devices, will, through the frictional contact of the wires with the walls of their bores, serve as a means for retaining the respective wires in positions of sliding adjustment through the respective sheaths.

The actuating devices for the wires 12 are equal in number to the signal blades 8 and are mounted upon a base plate 22 which is bolted or otherwise secured as at 23 upon the instrument board 24 of the automobile, preferably at the forward side of said board, and each of the said devices comprises a tubular barrel 25 which extends forwardly from the base plate 22 and in which is slidably mounted a plunger 26 the rear end of which extends through the inner end of the barrel and an opening 27 formed in the base plate 22, and likewise through an opening 28 which is formed in the instrument board 24, the plunger being provided at its inner end with a finger knob 29 which may be grasped for the purpose of sliding the plunger longitudinally in the respective barrel. The plunger is formed with an axially located bore 30 of small diameter into which is fitted the other end of the associated wire 12, and a set screw 31 is adjustably threaded in an opening 32 provided in the upper side of the respective plunger and bears at its lower end against the inserted end of the said wire so as to securely connect the said end of the wire with the plunger. The set screw 31 projects upwardly through a slot 33 formed longitudinally in the upper side of the plunger 25, and in this manner rotation of the plunger within the barrel is prevented. The barrel is interiorly threaded at its forward end so as to accommodate a threaded coupling sleeve 34 upon which is formed a polygonal portion 35 for the application of a small wrench, whereby the coupling may be tightened in the end of the respective barrel 25. A cap nut 36 is fitted onto the forward end of the coupling sleeve 34 and serves to connect, with the said sleeve, the other end of the respective sheath 21.

By reference to Figure 1 of the drawings it will be observed that the sheaths 21 are to be led, in the most convenient manner, from the lower ends of the tubular guides 19, to the respective barrels 25, the necessary deviations from a straight line of extent, being preferably effected by gradual bends in the said sheaths.

Inasmuch as the traffic regulations, in various localities, may necessitate the employment of different numbers of signal blades and signal blades of various colors or designs, or bearing various warning words, the present invention is not in any way limited to the number of such blades and likewise is not limited to the character of the blades. It will be evident however that the invention provides for adjustment of the blades to fully extended horizontal position or to any desired intermediate position of angular adjustment and it will be evident, from the foregoing description, that due to the frictional contact of the actuating wires 12 with the respective sheaths 21, the respective plungers 26 may be adjusted by pulling or pushing upon the same, so as to effect the desired angular adjustment of the respective signal blades and likewise the adjustment of the blades to inactive or concealed position within the housing 1, thus providing for maintenance of the signal blades in any position to which they may be adjusted, without the necessity of the driver of the automobile maintaining a grasp on the respective actuating plunger. It will also be evident that, by the use of the device, the necessity of leaving the pane of the door of the automobile next adjacent the driver, in an open or lowered position, is entirely avoided.

It will be understood of course that the signal blades are independently adjustable and that either blade may be displayed alone in a horizontal position or any intermediate position of angular adjustment, or that both blades may be simultaneously displayed in different positions of angular adjustment.

It will also be evident from the foregoing description and from an inspection of the drawings that the presence of the housing for the signal blades, upon the left rear fender of the automobile upon which the signal device is installed, does not detract from the artistic and graceful appearance of the body of the automobile, and likewise, the actuating mechanism which is mounted upon the instrument board will occupy but little space and, due to the fact that the base plate of this portion of the device is secured by two bolts, only, through the forward side of the instrument board, only the heads of these bolts and the knobs at the rear ends of the plungers appear at the face of the board.

It will be understood that in assembling the wires 12 with the plungers 26, the wires having previously been connected with the pivot members 13 of the signal plates and having been led through the tubular guides 21, each wire may be fitted at its said end through the bore of the respective plunger and a pull exerted upon the wire sufficient to suitably tension the same, after which the said screw 31 may be tightened and the surplus length of wire cut off at the respective end of the plunger.

Having thus described the invention, what I claim is:

1. In signal mechanism of the class described, a housing, a signal member pivotally suspended within the housing for swinging movement to extend laterally from the housing in various positions of angular adjustment, a manually operable actuating member, means for supporting the same, a tubular guide sheath extending between the said housing and the supporting means for the actuating member, and a semi-flexible connecting element operatively connected with the signal member and with the actuating member and extending through said sheath and in frictional contact with the sheath whereby to provide for maintenance of the signal member in positions of adjustment.

2. In signal mechanism of the class described, a housing, a signal blade suspended within the housing for swinging adjustment into and out of display position, an attaching member pivoted to the said signal blade eccentric to the point of suspension thereof, an actuating member, and a connecting wire connected to the said pivoted attaching member and to the said actuating member.

3. In signal mechanism of the class described, a housing, a signal blade suspended within the housing for swinging adjustment into and out of display position an attaching member pivoted to the said signal blade eccentric to the point of suspension of the blade, a tubular guide within the housing, an actuating member, and a wire connected to the actuating member extending through said guide and connected to the said attaching pivoted member.

4. In signal mechanism of the class described, a housing, a signal blade suspended within the housing for swinging adjustment into and out of display position, a pivot stud extending from one side of the blade and having a circumscribing groove therein, a pivot block pivotally fitted to said stud, the said block having a bore therein, a guide member within the housing, a wire fitted at one end in the bore in the block and engaging in the said groove in the pivot stud and, by reason of such engagement, retaining the block in position upon the pivot pin, a set screw upon the block engaging the said end of the wire and connecting the same with the block, the wire extending through the guide, and an actuating member to which the other end of the wire is connected.

5. In signal mechanism of the class described, the combination with a signal blade suspended for swinging adjustment into and out of display position, of means for adjusting the blade comprising a barrel, a plunger slidably fitted in the barrel, means upon one end of the plunger whereby the same may be adjusted in the barrel, the plunger at its other end having a socket, a flexible element fitted at one end in said socket, the said element being connected at its other end to the signal blade adjacent the point of suspension of said blade, and means securing the first mentioned end of the said connecting element in the said socket in the plunger.

6. In signal mechanism of the class described, the combination with a signal blade suspended for swinging adjustment into and out of display position, of means for adjusting the blade comprising a barrel, a plunger slidably fitted in the barrel, the barrel having a longitudinal slot therein, a finger piece upon one end of the plunger exteriorly of the barrel whereby the plunger may be adjusted in the barrel, the plunger at its other end having an axial socket therein, a flexible element fitted at one end in said socket, the said element being connected at its other end to the signal blade adjacent the point of suspension of said blade, and a binding screw threaded in the plunger and binding the first mentioned end of the flexible element in the said socket, the said binding screw extending through the slot in the barrel and constituting means, engageable with the end walls of the slot, to limit the sliding movement of the plunger in the barrel.

In testimony whereof I affix my signature.

ALBERT S. BOWERSOX.